(12) United States Patent
Edmark

(10) Patent No.: US 6,567,085 B1
(45) Date of Patent: May 20, 2003

(54) DISPLAY TECHNIQUES FOR THREE-DIMENSIONAL VIRTUAL REALITY

(75) Inventor: John T. Edmark, New York City, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/470,480

(22) Filed: Dec. 22, 1999

(51) Int. Cl.[7] .............................................. G06T 15/20

(52) U.S. Cl. ..................... 345/427; 345/422; 345/419

(58) Field of Search ................................ 345/427, 422, 345/419, 426, 505, 589, 634; 463/7, 37, 46; 340/971, 973; 701/141

(56) References Cited

U.S. PATENT DOCUMENTS

| | | | | |
|---|---|---|---|---|
| 3,577,120 A | * | 5/1971 | Sherbert, Jr. ................ 340/973 |
| 5,893,798 A | * | 4/1999 | Stambolic et al. ............ 463/46 |
| 5,990,900 A | * | 11/1999 | Seago et al. ................. 345/427 |
| 6,016,150 A | * | 1/2000 | Lengyel et al. .............. 345/426 |
| 6,151,028 A | * | 11/2000 | Kumagai et al. ............. 345/427 |
| 6,236,402 B1 | * | 5/2001 | Edmark ....................... 345/419 |

OTHER PUBLICATIONS

Owen et al., "Modeling and Interpreting Cartoon Characters," 1994, IEEE, pp. 148–155.*

Youichi Horry et al., "Tour Into The Picture: Using A Spidery Mesh Interface To Make Animation From A Single Image," Computer Graphics Proceedings, Annual Conference Series, 1997, pp. 225–232.

* cited by examiner

Primary Examiner—Almis R. Jankus
Assistant Examiner—Lance W. Sealey
(74) Attorney, Agent, or Firm—De Le Rosa & De Le Rosa LLC

(57) ABSTRACT

Although in my co-pending application, so-called "pyramidic panel structures" are employed to adjust the image's vanishing point(s) in accordance with the movement of the user, such structures have the disadvantage that they work primarily for so-called "corridor-like" two-dimensional images. I have recognized that, in accordance with the principles of the invention, viewpoint changes may be also dealt with by partitioning the two-dimensional image into polygon partitions, each corresponding to a surface being depicted in the image, and then coupling the vertices of the polygon partitions with the movement of the user so as to limit distortions. In this latter approach, two-dimensional images are not treated as a perspective, corridor-like image, thereby allowing a wider variety of two-dimensional images to be used with the present invention.

24 Claims, 5 Drawing Sheets

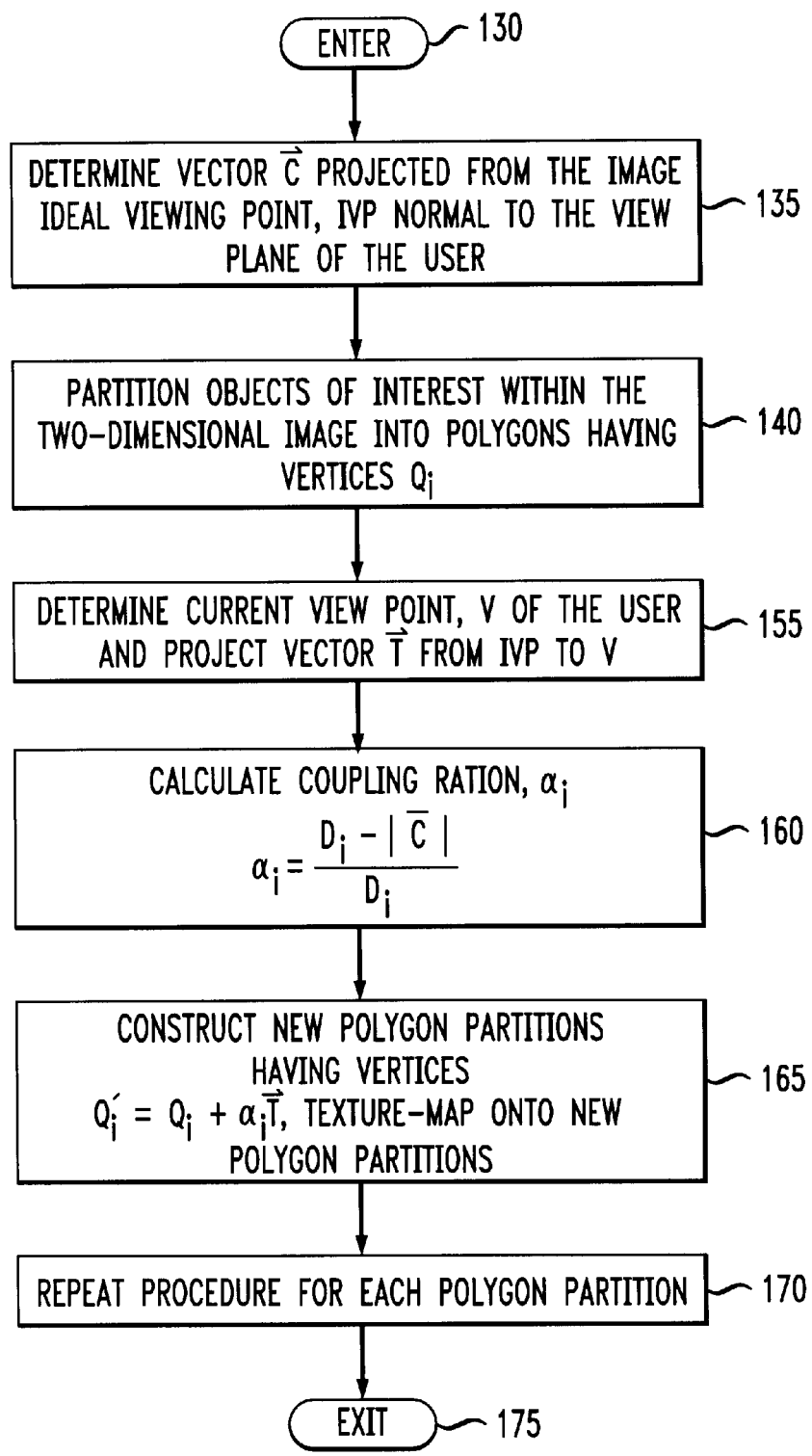

DISPLAY TECHNIQUES FOR THREE-DIMENSIONAL VIRTUAL REALITY

CROSS-REFERENCE TO RELATED APPLICATION

This application is related to applicant's U.S. patent application Ser. No. 09,190,743, filed on Nov. 12, 1998, which is commonly assigned and incorporated herein by reference.

TECHNICAL FIELD

This invention relates to the integration of three-dimensional computer graphics and a two-dimensional image to provide a realistic three-dimensional virtual reality experience.

BACKGROUND OF THE INVENTION

The display of a three-dimensional virtual reality world to a user requires considerable computation power, and it is typically costly to develop the necessary highly detailed models required for doing so. In order to simplify the problem, two-dimensional images, such as videos or photographs, may be used to represent or simulate portions of the three-dimensional world. A great reduction in computation power and cost can be achieved by such an arrangement.

A limitation of such a world occurs when a user moves within the world and views the world from a location different than the original context of the two-dimensional image which has been carefully calibrated to "fit into" the world. View changes, such as from a location different than the image's ideal viewing point also known as the "center of projection," result in the image not aligning or fitting well with surrounding objects of the three-dimensional world. Display techniques, however, to deal with such viewpoint changes are described in applicant's co-pending application which discloses manipulating the two-dimensional image through the use of so-called "pyramidic panel structures." More specifically, the two-dimensional image is manipulated so as to adjust the image's vanishing point(s) in accordance with the movement of the user. In this manner, as the user moves away from the ideal viewing point, warping acts to limit the discontinuities between the two-dimensional image and the surroundings of the world. However, these latter novel display techniques have the disadvantage that they work primarily for so-called "corridor-like" two-dimensional images, such as roads, or streets, wherein parallel features appear to converge at a so-called "vanishing point."

SUMMARY OF THE INVENTION

Although in my co-pending application, so-called "pyramidic panel structures" are employed to adjust the image's vanishing point(s) in accordance with the movement of the user, such structures have the disadvantage that they work primarily for "corridor-like" two-dimensional images. I have recognized that, in accordance with the principles of the invention, viewpoint changes may also be dealt with by partitioning the two-dimensional image into polygon partitions, each corresponding to a surface being depicted in the image, and then coupling the vertices of the polygon partitions with the movement of the user so as to limit distortions. More specifically, image points located farther away from the view plane oft he user move more closely with the movement oft he user's current view point than those image points located closer. In this manner, as the viewer moves away from the image's ideal viewing point, IVP, the resulting warping in the image acts to counteract and limit distortions. Importantly, in this latter approach, two-dimensional images are not treated as so-called "corridor-like" images, thereby allowing a wider variety of two-dimensional images to be used with the present invention.

BRIEF DESCRIPTION OF THE DRAWINGS

In the drawings:

FIG. 1 shows an example of that which a user sees when a user views the world from the ideal viewing point for a two-dimensional image representing a portion of the world;

FIG. 2 shows an example of that which a user sees when a user moves within the world of FIG. 1 and views the two-dimensional image from a location different than the image's ideal viewing point, without the use of the present invention;

FIG. 3 shows an exemplary process, in accordance with the principles of the invention, for manipulating the two-dimensional image in accordance with the movement of the user;

DETAILED DESCRIPTION

Figure 4:
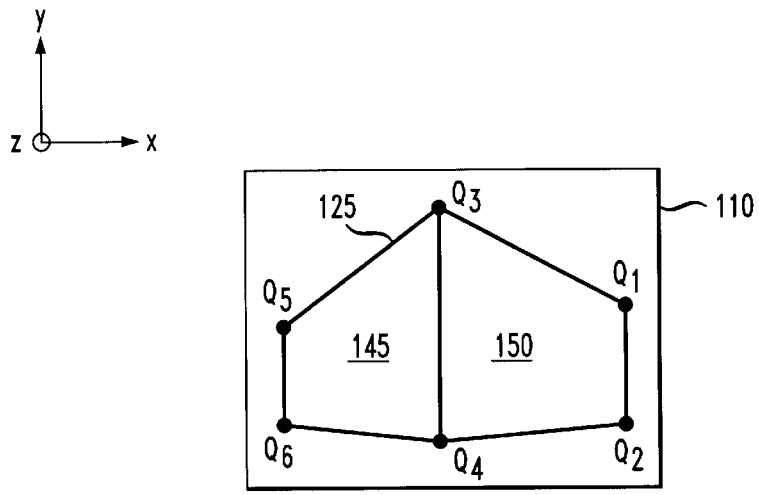
FIGS. 4–6 depict partitioning the two-dimensional image into polygon partitions and mapping the vertices thereof in accordance with the movement of the user.

To better understand the invention, FIGS. 1–2 show examples of that which a user sees when the user moves within a three-dimensional virtual reality world (x,y,z) and views a two-dimensional image (x,y) from a location at the image's ideal viewing point (IVP), and then from a different location, i.e., a location different than the original context of the image. For simplification of terminology purposes, we shall use the term two-dimensional image to denote either a video clip or a photograph.

FIG. 1 shows an exemplary three-dimensional reality world 105 which is divided into two portions, a view plane 110 on which is shown or displayed a two-dimensional image 115, such as a still photograph, picture or a current frame of a video clip; and the remainder of the world 120. In this case, two-dimensional image 115 is a picture of Bretton Hall located at the intersection of $86^{th}$ street and Broadway in New York City, used to simulate a building 125 within virtual reality world 105 defined by the rectangular coordinates (x,y,z). The remainder of the world 120 will be represented using computer graphics techniques, and is thus referred to herein as computer graphics (CG Part) 120. Although not shown, within CG Part 120 there may be various synthetic, three-dimensional objects modeled in, for example, the Virtual Reality Modeling Language (VRML).

Note that although three-dimensional world 105 cannot be actually rendered in a two-dimensional plane (x,y), it can be projected to and displayed on a view plane so as to appear to have three dimensions (x,y,z). Accordingly, the techniques of the present invention are preferably employed with computers and software, which are sufficiently sophisticated to display images on a two-dimensional plane as having three dimensions. Note that to make the world look realistic, computer graphics display techniques use the z component of objects to scale accordingly the x and y components as a function of its distance (z-axis) to the user's viewpoint.

Two-dimensional image 115 is carefully placed, cropped and sized in the surrounding environment of CG Part 120 as a function of the dimensions of the surroundings within the world. However, when viewing two-dimensional image 115, there exists only one viewpoint from which the image's content can be viewed properly. This unique location is called the image's ideal viewing point (IVP), also known as the "center of projection." In FIG. 1, two-dimensional image 115 is seen from its ideal viewing point. Users, however, rarely view image 115 only from its idea viewing point. As users move within world 105, such as to the left or right of building 125, or move closer to or farther away from the image, they view image 115 from positions other than its ideal viewing point. Absent the use of the present invention, such viewpoint changes would cause features within image 115 to distort as shown in FIG. 2.

Unlike applicant's above referenced co-pending application, two-dimensional images are not treated as so-called "corridor-like" image, thereby allowing a wider variety of two-dimensional images to be used with the present invention. Similarly, however, as the user moves away from the ideal viewing point, two-dimensional image 115 is manipulated to account for the movement of the user, as discussed herein below. In accordance with the principles of the invention, two-dimensional image 115 is partitioned into separate polygon partitions, each corresponding to a desired surface of objects depicted in the image. Each vertex of the polygon partition is then coupled to the movement of the user with respect to the image's ideal viewing point, with the coupling strength dependent on the vertex's distance from view plane 110, as discussed more fully herein below. The result of this coupling is that objects in two-dimensional image 115 appear to behave as textured-mapped solid models.

FIG. 3 shows an exemplary process in accordance with the principles of the invention for manipulating two-dimensional image 115 in accordance with the viewer's position. The process is entered at step 130 whenever it is determined that the viewer's position has changed.

At step 135, a vector, $\overline{C}$ is projected from the image's ideal viewing point, IVP, normal to view plane 110 which contains image 115. At step 140, objects of interest within two-dimensional image 115 are then partitioned into separate polygon partitions, each corresponding to a desired surface of the object, as depicted in FIG. 4. Here, and for illustration purposes only, building 125 has been segmented into only two polygon partitions 145 and 150, corresponding to the left and right sides of the building, respectively. Note that the vertices of the polygon partitions are labeled $Q_1$–$Q_6$, with their intersection located along line segment $\overline{Q_3Q_4}$.

Figure 5:
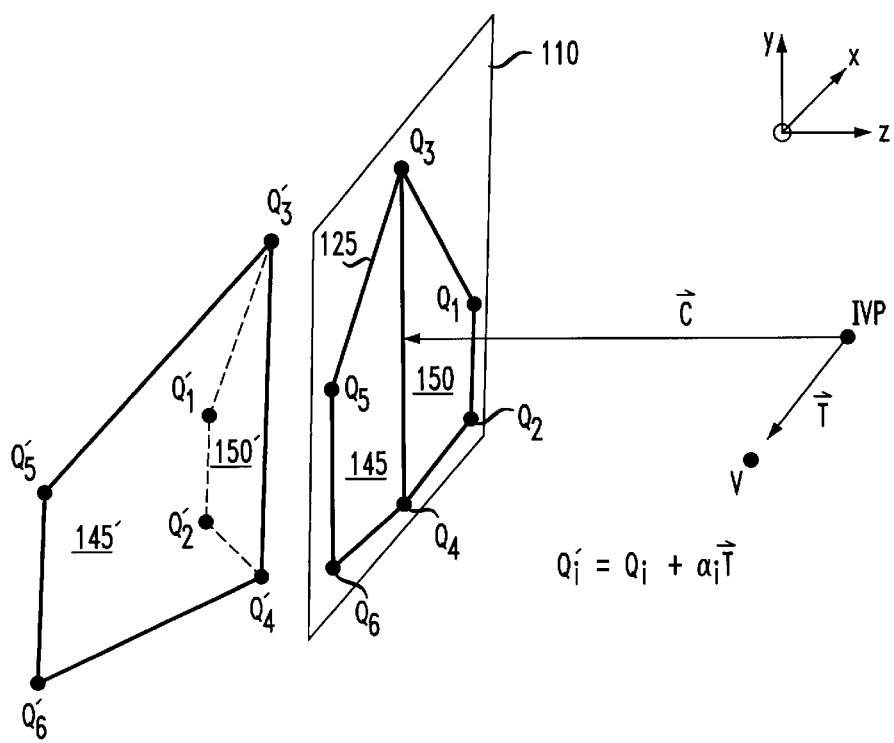
Figure 6:
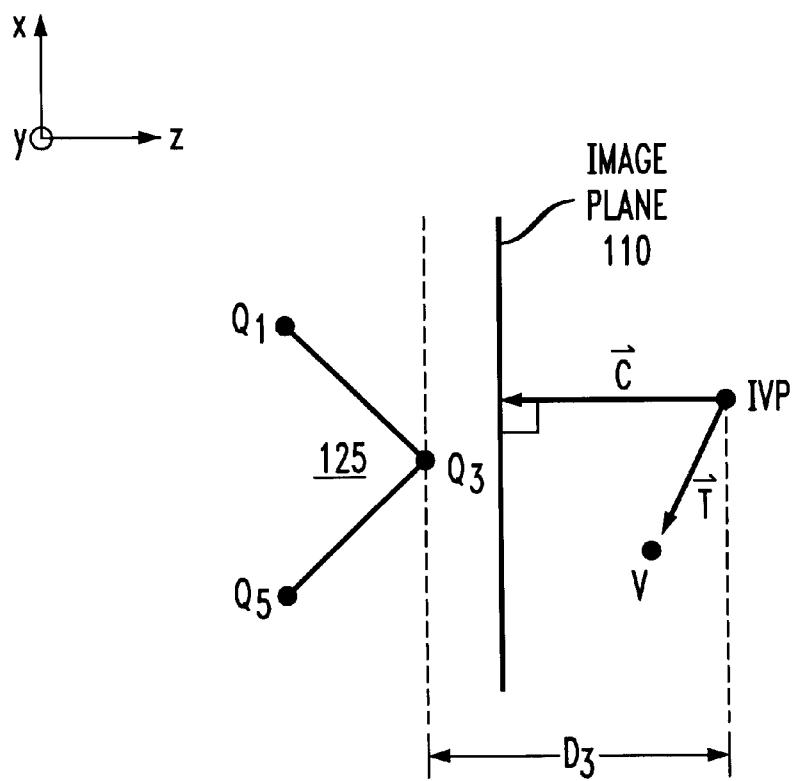

Thereafter in step 155, the current viewpoint of the user, V, is determined, and a vector $\overline{T}$ projected from the ideal viewing point, IVP, to the viewer's current location, V. Next at step 160, a coupling ratio $\alpha_i$ is calculated for each vertex $Q_i$ according to the following equation:

$$\alpha_i = \frac{D_i - |C|}{D_i}, \quad \text{Eq. (1)}$$

where $D_i$ is the orthogonal distance from the image's ideal viewing point (IVP) to the image plane in the three dimensional space (x,y,z) of the virtual world containing the vertex $Q_i$. As the viewer moves, each vertex $Q_i$ is then mapped into a new vertex $Q_i'$ in accordance with the following equation at step 165:

$$Q_i' = Q_i + \alpha_i \overline{T} \quad \text{(Eq.2)}$$

thereby forming new polygon partitions 145' and 150' within the world coordinates (x,y,z). This is illustrated in FIG. 5. Also for illustration purposes, shown in FIG. 6 is the orthogonal distance $D_3$ for vertex $Q_3$. Note that $\alpha_i$ varies from 1 for those vertex points located at infinity ($D=\infty$) to 0 for those vertex points located at the viewing image plane $D=|\overline{C}|$, thereby providing stronger coupling for objects farther away. At step 165, the corresponding images in original polygon partitions 145 and 150 are then texture-mapped onto new polygon partitions 145' and 150', respectively. Similarly, the above described procedure is repeated for each polygon partition (step 170).

It should be understood that the above polygons partitions have been manipulated in the three-dimensional space (x,y,z) of the virtual world at step 165 such that image points located farther away from view plane 110 move more closely with the movement of the user's current view point than those points located farther closer to the view plane. In this manner, as the viewer moves away from the image's ideal viewing point, IVP, the resulting warping in the image acts to limit distortions.

Figure 7:
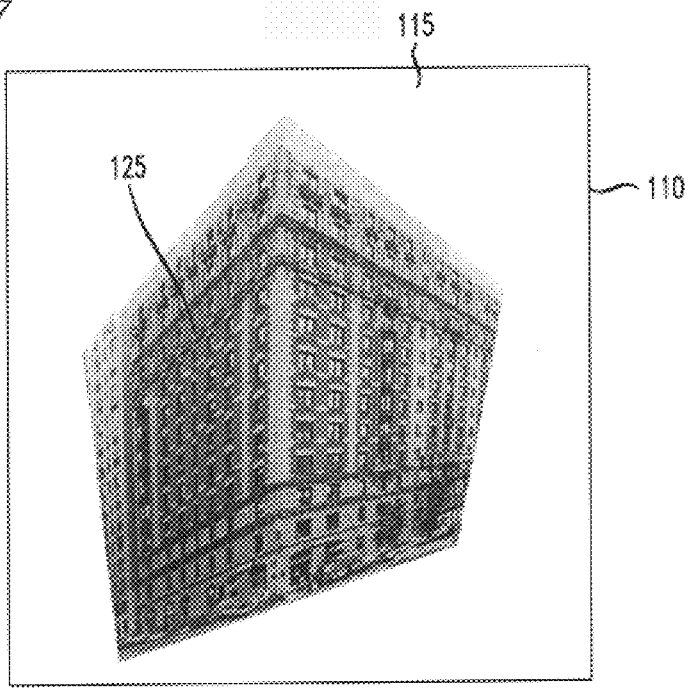
FIGS. 7 and 8 depict examples of that which a user sees when a user views the world from a location left of the image's ideal viewing point, without and with the use of the present invention, respectively.
Figure 8:
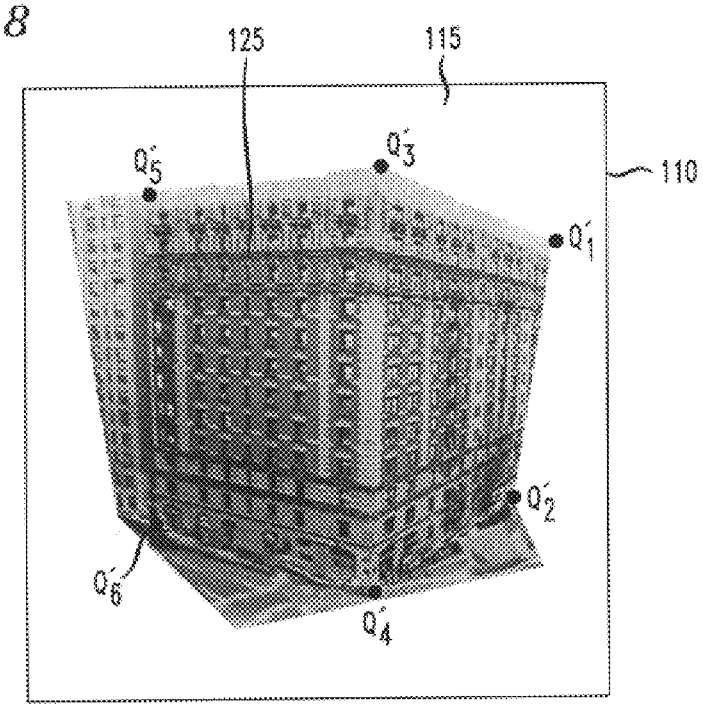

FIGS. 7 and 8 compare the display of two-dimensional image 115 for the display of the same image, with and without the use of the polygon partitions of the present invention. More specifically, FIG. 7 depicts viewing two-dimensional image 115 at a location from the left of the image's ideal viewing point, IVP, without the use of the present invention. In this latter figure, note the distortions in the image. FIG. 8 depicts the same two-dimensional image manipulated in accordance with the principles of the invention. Note, however, that in this latter figure, the distortions has been substantially eliminated.

It should be clearly understood that objects within the two-dimensional image may be partitioned into more than two polygon partitions, if. For example, instead of treating the sides of the building as two surfaces, multiple polygon partitions may be employed, each representing a different portion of the building in the three-dimensional space of world 105, such as doors, walls and windows. In such a case, each polygon partition is manipulated likewise in the same manner as described herein above. Partitioning objects in the two-dimensional image into a greater number of smaller polygon partitions further reduces distortions. It is contemplated that the number of polygon partitions that each object is divided into may be chosen empirically based on image content as well as the user's range of movement within the virtual world, and the processing power of the computer system used.

The foregoing merely illustrates the principles of the invention. It will thus be appreciated that those skilled in the art will be able to devise various arrangement which, although not explicitly describe or shown herein, embody the principles of the invention and are included within its spirit and scope.

What is claimed is:

1. A method for use in processing a view of a three-dimensional world in which a first portion of said world is modeled as computer graphics and a second portion of said world is represented by a two-dimensional image, comprising the steps of:

determining the user current viewpoint of the two-dimensional image;

partitioning the two-dimensional image into polygon partitions, each corresponding to a desired surface of an object being depicted in the two-dimensional image;

warping the polygon partitions in accordance with the movement of the user current viewpoint from the ideal viewing point of the two-dimensional image, such that image points located farther away from the view plane of the user are more closely coupled with the movement of the user's current view point than those points located closer to the view plane; and as the user moves within the three-dimensional world, repeating the above warping step so as to limit discontinuities between said two-dimensional image and the computer graphics.

2. The invention as defined in claim 1 further comprising the step of calibrating the two-dimensional image as a function of the dimensions of the surroundings within the world.

3. The invention as defined in claim 1 wherein said two-dimensional image is a not a "corridor-like" image.

4. The invention as defined in claim 1 further comprising the step of displaying the two-dimensional image merged with the first portion of said world that is modeled as computer graphics.

5. The invention of claim 1 wherein said two-dimensional image is a frame of video.

6. The invention of claim 1 wherein said two-dimensional image is a still picture.

7. A method for use in processing a view of a three-dimensional world in which a first portion of said world is modeled as computer graphics and a second portion of said world is represented by a two-dimensional image projected on a view plane having a ideal viewing point (IVP), comprising the steps of:

projecting a vector $\overline{C}$ from the image's ideal viewing point (IVP) normal to the view plane of the two-dimensional image;

partitioning the two-dimensional image into a first set of polygon partitions having vertices labeled $Q_1$–$Q_i$, each of said polygon partitions corresponding to a surface being depicted in the two dimensional image, where i is an integer number;

projecting a vector $\overline{T}$ from the image's ideal viewing point, IVP, to the current viewpoint, V;

determining a coupling ratio $\alpha_i$ for each vertex given by $$\alpha_i = \frac{D_i - |\overline{C}|}{D_i},$$

where $D_i$ is the orthogonal distance from the image's ideal viewing point (IVP) to the image plane in the three dimensional space (x,y,z) of the world containing the vertex $Q_i$;

mapping the vertices $Q_1$–$Q_i$ to $Q_1'$–$Q_i'$, respectively, in the three-dimensional space (x,y,z) of the world according with the following relationship, $Q_i' = Q_i + \alpha_i \overline{T}$, thereby defining a second set of polygon partitions; and mapping the corresponding image in said first set of polygon partitions into said second set of polygon partitions.

8. The invention as defined in claim 7 further comprising the step of calibrating the two-dimensional image as a function oft he dimensions of the surroundings within the world.

9. The invention as defined in claim 7 wherein said two-dimensional image is a not a "corridor-like" image.

10. The invention as defined in claim 7 further comprising the step of displaying the two-dimensional image merged with the first portion of said world that is modeled as computer graphics.

11. The invention of claim 7 wherein said two-dimensional image is a frame of video.

12. The invention of claim 7 wherein said two-dimensional image is a still picture.

13. An apparatus for use in processing a view of a three-dimensional world in which a first portion of said world is modeled as computer graphics and a second portion of said world is represented by a two-dimensional image, said apparatus comprising:

means for determining the user current viewpoint of the two-dimensional image;

means for partitioning the two-dimensional image into polygon partitions, each corresponding to a desired surface of an object being depicted in the two-dimensional image; and as the user moves within the three-dimensional world, means for repeatingly warping the polygon partitions in accordance with the movement of the user current viewpoint from the ideal viewing point of the two-dimensional image, such that image points located farther away from the view plane of the user are more closely coupled with the movement of the user's current view point than those points located closer to the view plane so as to limit discontinuities between said two-dimensional image and the computer graphics.

14. The invention as defined in claim 13 further comprising means for calibrating the two-dimensional image as a function of the dimensions of the surroundings within the world.

15. The invention as defined in claim 13 wherein said two-dimensional image is not a "corridor-like" image.

16. The invention as defined in claim 13 further comprising means for displaying the two-dimensional image merged with the first portion of said world that is modeled as computer graphics.

17. The invention of claim 13 wherein said two-dimensional image is a frame of video.

18. The invention of claim 13 wherein said two-dimensional image is a still picture.

19. An apparatus for use in processing a view of a three-dimensional world in which a first portion of said world is modeled as computer graphics and a second portion of said world is represented by a two-dimensional image projected on a view plane having a ideal viewing point (IVP), said apparatus comprising:

means for projecting a vector $\overline{C}$ from the image's ideal viewing point (IVP) normal to the view plane of the two-dimensional image;

means for partitioning the two-dimensional image into a first set of polygon partitions having vertices labeled $Q_1$–$Q_i$, each of said polygon partitions corresponding to a surface being depicted in the two dimensional image, where i is an integer number;

means for projecting a vector $\overline{T}$ from the image's ideal viewing point, IVP, to the current viewpoint, V;

means for determining a coupling ratio $\alpha_i$ for each vertex given by $$\alpha_i = \frac{D - |\overline{C}|}{D},$$

where $D_i$ is the orthogonal distance from the image's ideal viewing point (IVP) to the image plane in the three dimensional space (x,y,z) of the world containing the vertex $Q_i$;

means for mapping the vertices $Q_1$–$Q_i$ to $Q_1'$–$Q_i'$, respectively, in the three-dimensional space (x,y,z) of the world according with the following relationship, $Q_i'=Q_i+\alpha_i \overline{T}$, thereby defining a second set of polygon partitions; and means for mapping the corresponding image in said first set of polygon partitions into said second set of polygon partitions.

20. The invention as defined in claim 19 further comprising means for calibrating the two-dimensional image as a function of the dimensions of the surroundings within the world.

21. The invention as defined in claim 19 wherein said two-dimensional image is not a "corridor-like" image.

22. The invention as defined in claim 19 further comprising means for displaying the two-dimensional image merged with the first portion of said world that is modeled as computer graphics.

23. The invention of claim 19 wherein said two-dimensional image is a frame of video.

24. The invention of claim 19 wherein said two-dimensional image is a still picture.

* * * * *